(12) United States Patent
Willehadson et al.

(10) Patent No.: US 6,327,567 B1
(45) Date of Patent: Dec. 4, 2001

(54) METHOD AND SYSTEM FOR PROVIDING SPATIALIZED AUDIO IN CONFERENCE CALLS

(75) Inventors: Stefan Willehadson; Jan Gabrielsson; Hans Hall, all of Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/248,330

(22) Filed: Feb. 10, 1999

(51) Int. Cl.[7] .................................................. G10L 21/00
(52) U.S. Cl. ............................................ 704/270; 704/231
(58) Field of Search ..................................... 704/200, 270, 704/275, 272, 278, 500, 503, 200.1, 231; 379/202; 381/310, 63, 313

(56) References Cited

U.S. PATENT DOCUMENTS

| | | | |
|---|---|---|---|
| 4,305,149 | 12/1981 | Harrison | 370/62 |
| 4,317,961 | 3/1982 | Johnson | 179/18 |
| 4,734,934 | 3/1988 | Boggs et al. | 379/202 |
| 5,020,098 | * 5/1991 | Celli | 379/202 |
| 5,046,097 | * 9/1991 | Lowe et al. | 381/17 |
| 5,105,462 | * 4/1992 | Lowe et al. | 381/17 |
| 5,208,860 | * 5/1993 | Lowe et al. | 381/17 |
| 5,371,799 | * 12/1994 | Lowe et al. | 381/25 |
| 5,373,549 | 12/1994 | Bales et al. | 379/93 |
| 5,483,588 | 1/1996 | Eaton et al. | 379/202 |
| 5,495,522 | 2/1996 | Allen et al. | 379/202 |
| 5,596,644 | * 1/1997 | Abel et al. | 381/17 |
| 5,625,407 | 4/1997 | Biggs et al. | 348/16 |
| 6,125,115 | * 9/2000 | Smits | 370/389 |

FOREIGN PATENT DOCUMENTS 2 303 516 A    2/1997   (GB) .

OTHER PUBLICATIONS

Wearable computers, 1998. Billinghurst et al., "A wearable spatial conferecning space". pp. 76–83. Oct. 1998.*
Standard Search Report for RS 102633 US Completed on Jun. 30, 1999.
R. Botros, O. Abdel–Alim, P. Damaske, "Stereophonic Speech Teleconferencing", ICASSP 86 Proceedings; IEEE–IECEJ–ASJ International Conference on Acoustics, Speech and Signal Processing, Apr. 7–11, 1986, pp. 26.6.1–26.6.4, XP002107517.

* cited by examiner

Primary Examiner—Richemond Dorvil
(74) Attorney, Agent, or Firm—Jenkens & Gilchrist, P.C.

(57) ABSTRACT

A method for spatializing audio in conference calls is described in which the participants in the calls are placed in particular locations in order to provide an additional dimension (direction) so that the participants can better recognize who is speaking. Also, the dimension of volume is provided, which can be used in creating background sub-conferences. Consequently, sub-conferences can be conducted in which the participants can move seamlessly between them and also listen to other sub-conferences being conducted in the background.

46 Claims, 4 Drawing Sheets

US 6,327,567 B1

METHOD AND SYSTEM FOR PROVIDING SPATIALIZED AUDIO IN CONFERENCE CALLS

BACKGROUND OF THE INVENTION

1. Technical Field of the Invention

The present invention relates generally to the telecommunications field and, in particular, to a method and system for providing spatialized audio in conference calls.

2. Description of Related Art

Conference calls are becoming an increasingly common communications medium. For example, a large corporation can have offices located throughout the world, but the corporation's employees at different locations are often required to consult with each other by conference call, in order to develop conclusions and solutions for pressing problems. Furthermore, the younger generation's current use of Internet chat rooms for "text-chats" will likely extend that practice to "voice-chats" (i.e., conference calls).

The conventional conference call systems in use today utilize a single voice channel for all participants, and a moderator typically controls the conference calls. As such, an individual can participate in only one conference call at a time.

A number of significant problems exist with the existing approaches taken for making conference calls. For example, during a conference call, it is often difficult to recognize who is speaking by voice alone. This recognition problem can be exacerbated if there are several participants in the conference call with similar regional accents or voices that sound similar. Furthermore, two or more conference call participants can be speaking at the same time, which degrades the conversations. Another problem with existing conference call approaches is that they do not make it possible to divide a conference call into a number of sub-conferences, and also to allow participants to move freely between the sub-conferences. Yet another problem with existing conference call approaches is that a moderator needs to be appointed whenever the number of participants exceeds a certain limit. However, as described in detail below, the present invention successfully resolves the above-described problems.

SUMMARY OF THE INVENTION

In accordance with the present invention, a method is provided for spatializing audio in conference calls, in which the participants in the calls are placed in particular locations in order to provide an additional dimension (direction) so that the participants can better recognize who is speaking. Also, the dimension of volume is provided, which can be used in creating background sub-conferences. Consequently, sub-conferences can be conducted in which the participants can move freely between them and also listen to other sub-conferences being conducted in the background.

An important technical advantage of the present invention is that by using a spatial layout for a conference call, the audio streams from different sub-conferences are distinguishable, and a user is then able to attend multiple sub-conferences.

Another important technical advantage of the present invention is that by using a spatial layout for a conference call, one participant will always know which other participant is speaking, as long as the first participant knows the spatial location of the other participant.

Yet another important technical advantage of the present invention is that the use of a spatial layout for conference calls can be used as an aid for auditory memory. This approach can be useful when a participant is located in a noisy environment and it is difficult to recognize a speaker by voice alone, or one person participates in a conference with other people who are unknown and it is difficult to recognize the speaker by voice alone.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, in accordance with the present invention, a method for spatializing audio in conference calls is provided in which the participants in the calls are placed in particular locations in order to provide an additional dimension (direction) so that the participants can better recognize who is speaking. Also, the dimension of volume is provided, which can be used in creating background sub-conferences. Consequently, sub-conferences can be conducted in which the participants can move seamlessly between them and also listen to other sub-conferences being conducted in the background.

Figure 1A:
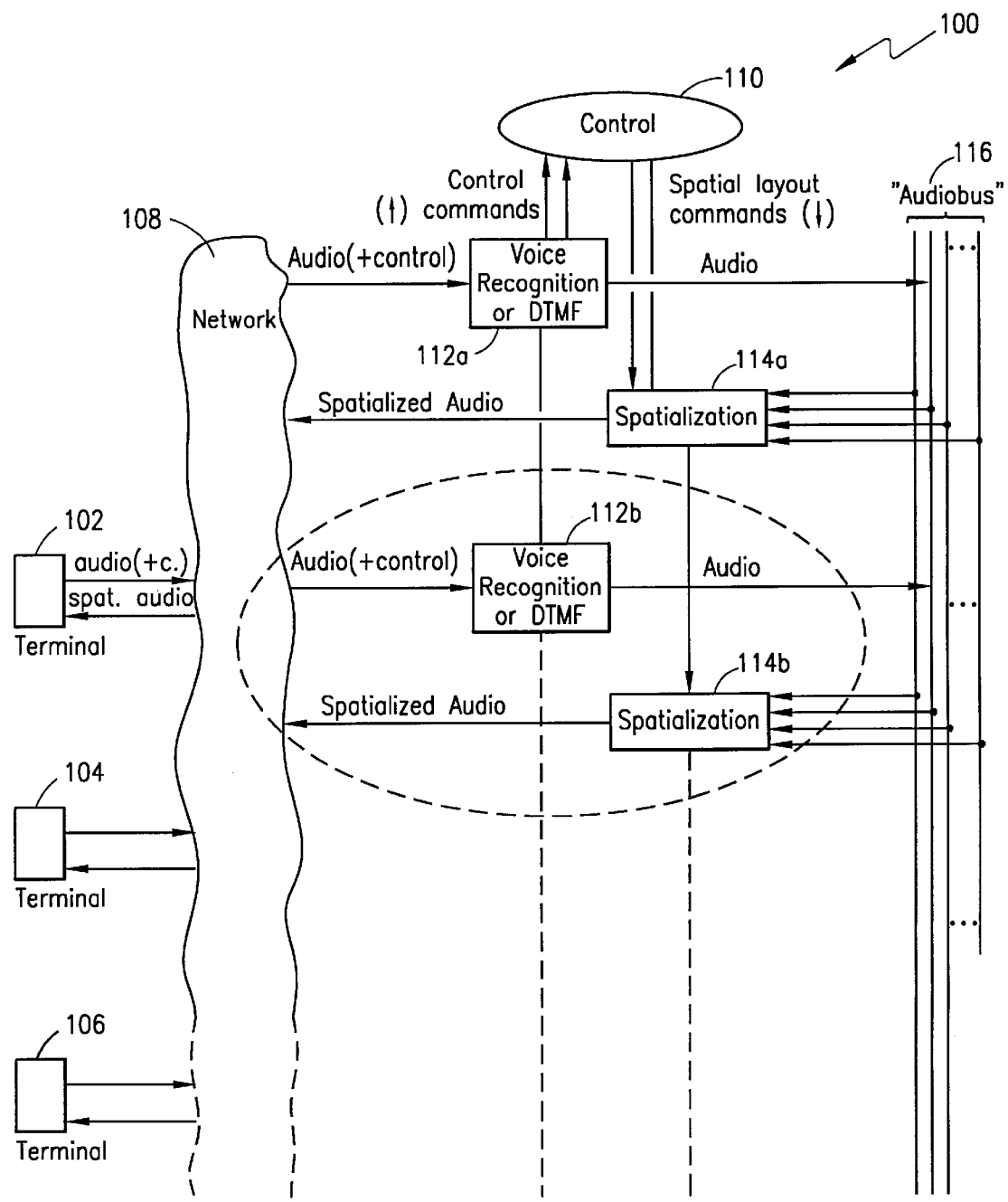
FIG. 1A is a diagram that illustrates a centralized conference call system that can be used to provide spatialized audio, in accordance with a preferred embodiment of the present invention.
Figure 1B:
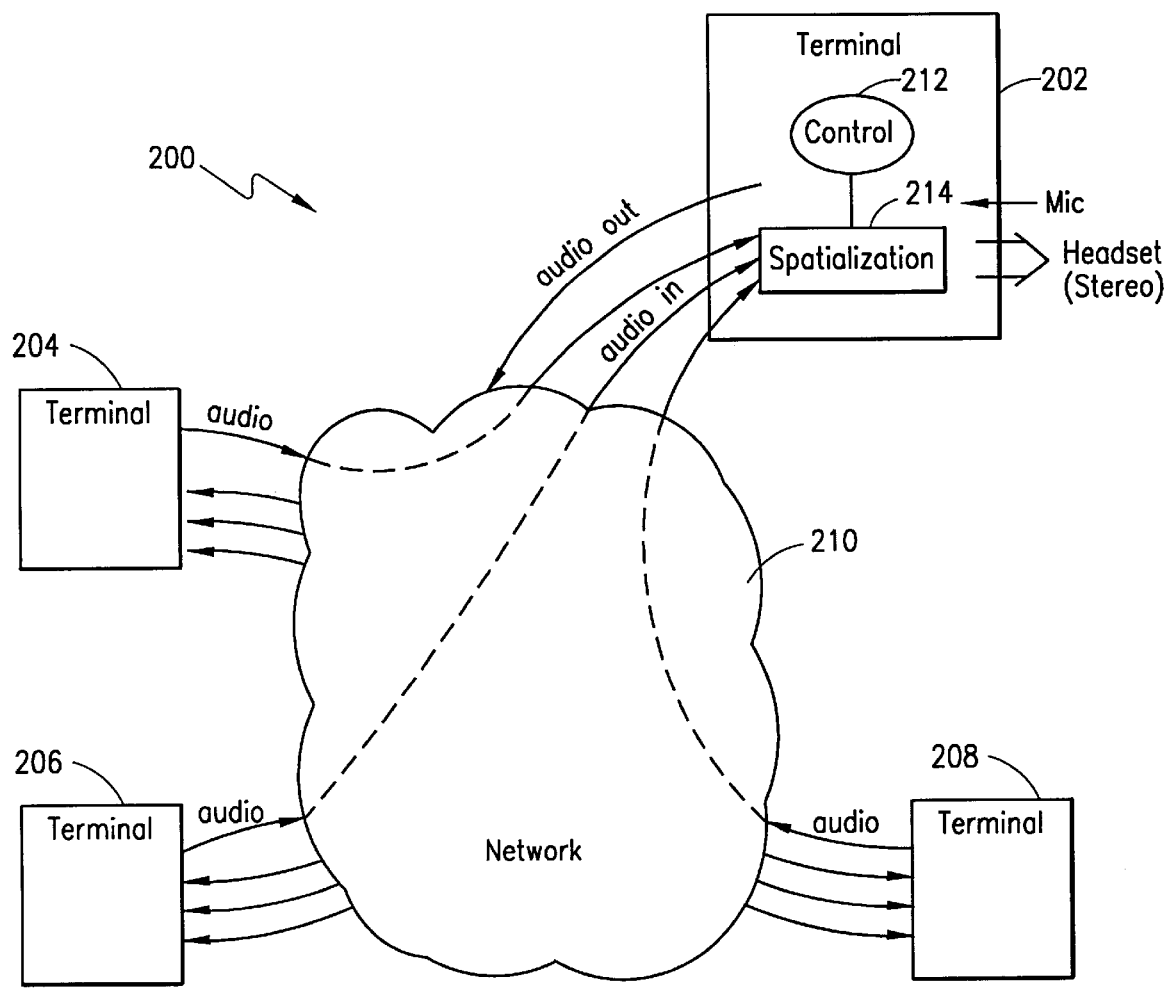
FIG. 1B is a diagram that illustrates a distributed conference call system that can be used to provide spatialized audio, in accordance with the preferred embodiment of the present invention.

Specifically, as illustrated by the diagrams shown in the related FIGS. 1A and 1B, there are two types of conference call systems that can provide spatialized audio: centralized and distributed systems. In a centralized system (e.g., as shown in FIG. 1A), the spatialization process (i.e., process of giving a direction to the source of the audio stream) takes place at a central location. In a distributed system (e.g., as shown in FIG. 1B), the spatialization process takes place at each terminal involved in the conference call. Notwithstanding the type of conference call system involved, in accordance with a preferred embodiment of the present invention, each participant in the conference call preferably wears a stereo headset or similar apparatus which is fed by two relatively high-quality audio channels (e.g., >20 kHz). Consequently, in the preferred embodiment, the conference calls can be implemented with 3-dimensional spatialization.

Referring to the exemplary centralized system 100 shown in FIGURE 1A, a plurality of conference call participants are using terminals (e.g., telephones with headsets) 102, 104, 106, which are connected to a network 108. For example, the exemplary network 108 can be a Public Switched Telephone Network (PSTN), a Public Land Mobile Network (PLMN), or the Internet, and the telephones (102–106) can be fixed telephones, mobile radiotelephones, or Personal Computers (PC's), respectively.

For this embodiment, the system 100 also includes a conference call control unit 110 (e.g., part of a server or similar processing unit in the network) connected to a plurality of command units 112a–n and spatialization units 114a–n. The command units 112 and spatialization units 114 are further connected to a common audio bus 116. More precisely, each command unit 112 can output an audio signal to a conductor in the audio bus 116, and a control (command) signal to the control unit 110. Each spatialization unit 114 can receive a plurality of audio signals from the conductors of the audio bus 116, and output a spatialized audio signal which is coupled to the network 108 and then to the terminals 102–106. As such, the control unit, command units, spatialization units, etc., can be analog or digital units.

In operation, a user of a terminal (102, 104, 106, etc.) can send a voice command or other type of control signal (e.g., DTMF tone) to an assigned command unit (112) via an audio connection. For example, in order for the command unit to distinguish between a voice command and ordinary speech, the user can initially vocalize a predetermined keyword which is unique and unlikely to be interpreted as ordinary speech. A recognition unit associated with the command unit can recognize the spoken keyword as a voice command. Alternatively, for example, the user can press a button (or key) that sends a unique DTMF code to the command unit. The DTMF code can be recognized by the associated recognition unit as an instruction to interpret subsequent vocalized words as commands. As another example, a user-to-user signalling method of issuing commands can be used. For example, a signalling channel can be used to send a command signal to the command unit. Such signalling channels are available, for example, in ISDN networks and also in mobile communications networks (e.g., in the GSM). As such, in responses the command unit 112 routes the control signal to the control unit 110, and couples any audio signals to a conductor (channel) in the audio bus 116. The control signal instructs the control unit 110 about the user's preferences as to a spatial layout (e.g., formation of a sub-conference, etc.). In response to the user's commands, the control unit 110 sends spatial layout commands to the spatialization units 114, which combine the plurality of audio signals received from the audio bus 116 so as to configure spatial layouts in accordance with the users' preferences. The resulting spatialized audio signals are then coupled to the users' terminals via the network 108.

Figure 2:
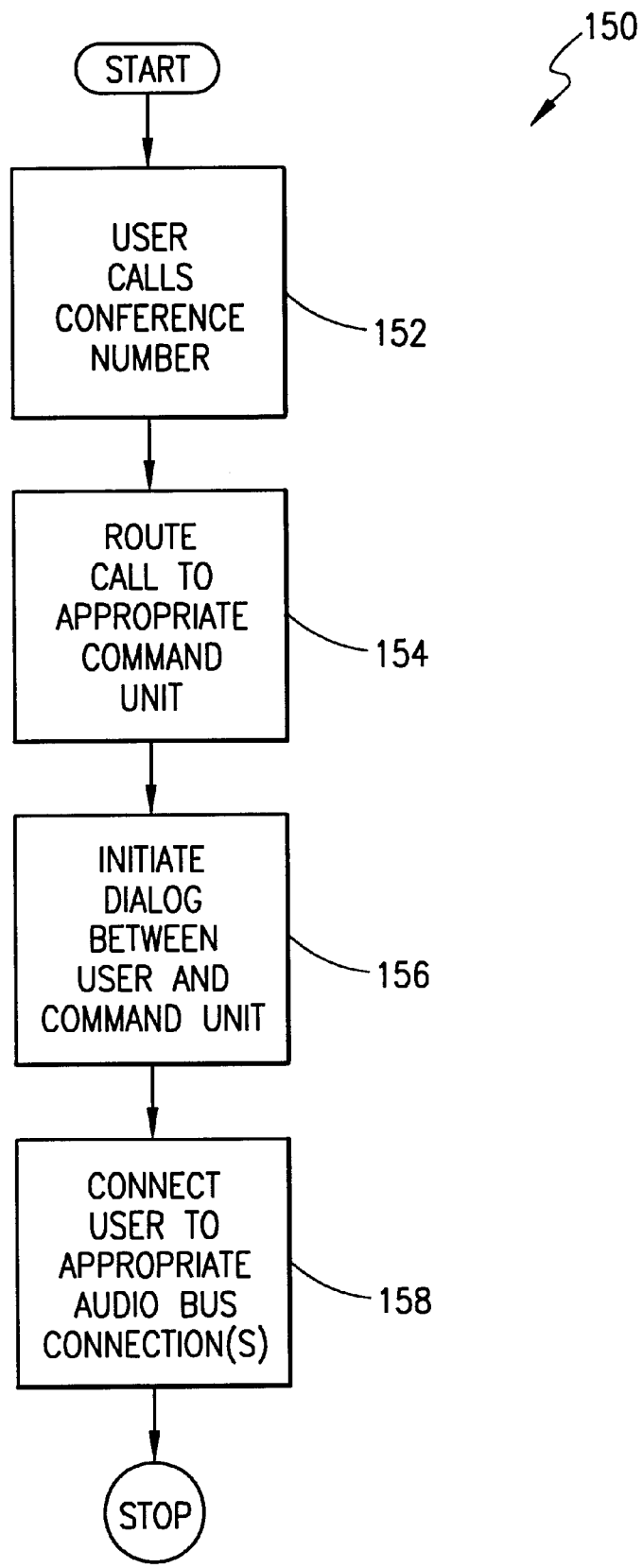
FIG. 2 is a flow diagram of an exemplary method that can be used by a user of a terminal to register with a conference, in accordance with the preferred embodiment of the present invention.

More specifically, FIG. 2 is a flow diagram of an exemplary method 150 that can be used by a user of a terminal to register with a conference, in accordance with the preferred embodiment of the present invention. At step 152, the user (of a terminal 102, etc.) calls a telephone number associated with the intended conference, and at step 154, the call is routed (via the network 108) to a command unit (e.g., 112a). At step 156, the user enters a dialog with the command unit 112a. During this dialog, the command unit 112a interrogates the user to determine, for example, the user's name, what conference the user intends to be connected to as an active participant, and what conference(s) should remain in the background, etc. At step 158, the control unit 110 connects the user to at least one conductor (channel) of the audio bus 116, and thus determines the relative position of the user in the conference.

Referring to the exemplary distributed system 200 shown in FIG. 1B, a plurality of conference call participants are using terminals (e.g., telephones with headsets) 202, 204, 206, 208, which are connected to a network 210. Again, for this exemplary embodiment, the network 210 can be a PLMN or the Internet, and the telephones (202–208) can be fixed telephones, mobile radiotelephones or PC's, respectively. Alternatively, the network 210 can be a PSTN, which is technically possible but less likely to be used in reality.

For this embodiment, each of the terminals 202–208 can be configured to include a control unit (e.g., 212) and a spatialization unit (eg., 214). In other words, the audio spatialization in this distributed conference call system 200 is preferably accomplished at the terminals involved in the conference call. Each terminal 202–208 outputs an audio signal (e.g., originating from a microphone for the respective user), which is coupled via the network 210 to a spatialization unit in each of the other terminals involved in the conference call.

In operation (referring to the distributed system shown in FIG. 1B), with a voice command or other command signal (DTMF tone), a terminal's user (e.g., for terminal 202) inputs a control signal to the control unit (e.g., 212) in that terminal. For example, as described earlier with respect to FIG. 1A, the user's command can be a unique keyword or DTMF code. Also as described earlier, a user-to-user signalling method of issuing commands can be used (e.g., using a signalling channel to convey a user's commands). The resulting control signal instructs the control unit 212 about the user's preferences as to a spatial layout (e.g., create a sub-conference, etc.). In response to the user's command, the control unit 212 sends a spatial layout command signal to the spatialization unit 214, which combines the plurality of audio signals received from the other terminals involved in the call, so as to configure a spatial layout in accordance with the user's preference. The resulting spatialized audio signals are then coupled to the user's (stereo) headset.

In accordance with the present invention, a user can identify a plurality of sub-conferences by their relative spatial locations. The user can then select one of those conferences for active participation. For example, a list of identifiers associated with the sub-conferences and information about their relative positions can be displayed by a terminal (e.g., using a PC via the Internet). The user then selects from the list in order to participate in one or more of the sub-conferences. Alternatively, for example, the user can initiate a procedure that browses the audio channels, whereby the system couples the user to each of a succession of different sub-conferences (e.g., brings each of the sub-conferences to the foreground in succession). As such, for example, during a certain period of time, the user can select one (or more) of those sub-conferences for active participation (e.g., by sending a DTMF signal or voice command to the control unit 110 or 212).

Figure 3A:
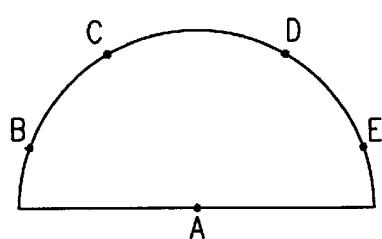
FIGS. 3A and 3B are related diagrams that illustrate a spatial layout for a conference call, in accordance with the preferred embodiment of the present invention.
Figure 3B:
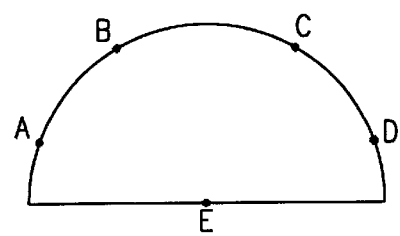

FIGS. 3A and 3B are related diagrams that illustrate a spatial layout for a conference call, in accordance with the preferred embodiment of the present invention. Essentially, a round table approach can be used for selecting the position of the participants involved in the conference call. In other words, for this embodiment, there is a consistent left-to-right order used for the participants involved. As such, referring to FIG. 3A, from a first participant's (A) point of view with respect to the spatial layout of the conference, that participant (A) is located in the center of a circle, and the other participants (B–E) are located in the half circle in "front" of the first participant (A). Similarly; referring to FIG. 3B, from participant E's point of view (maintaining the left-to-right order), that participant (E) is located in the center of the circle, while the other participants (A–D) are in "front" of participant E. Such a layout is preferable, because people prefer to hold conversations with other people who are in front of them rather than behind them. Nevertheless, although a left-to-right order is used for the preferred embodiment, the invention is not intended to be so limited, and in a different embodiment, a right-to-left order can be used.

Figures 4A, 4B:
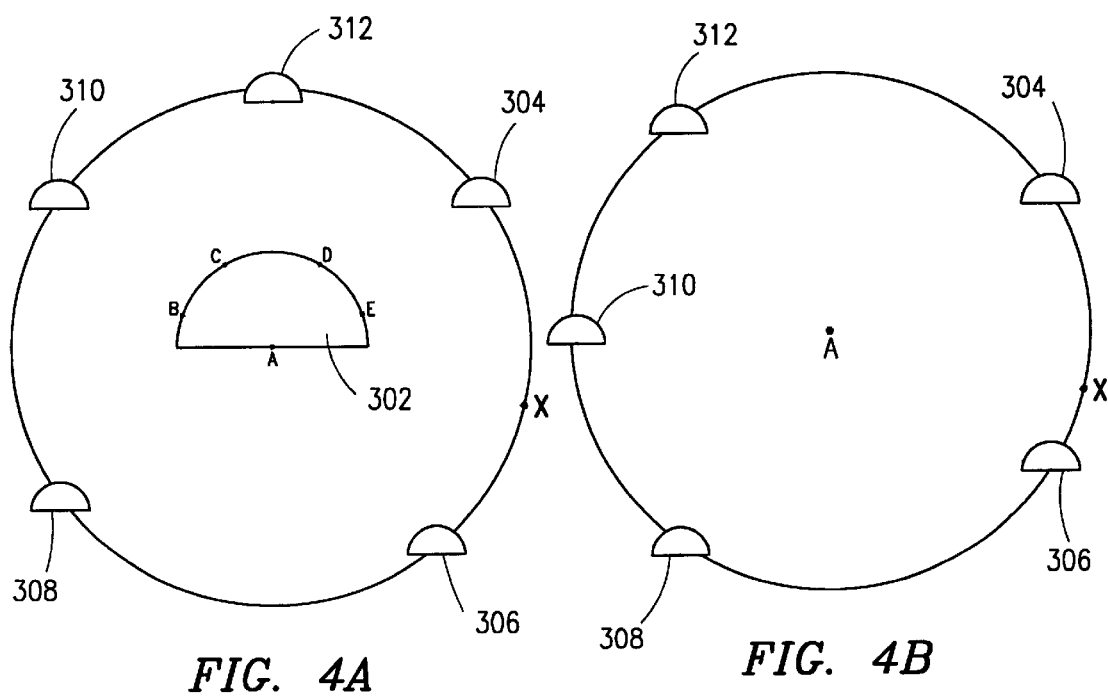
FIGS. 4A and 4B are related diagrams that illustrate a spatial layout for a plurality of sub-conferences, in accordance with the preferred embodiment of the present invention.

FIGS. 4A and 4B are related diagrams that illustrate a spatial layout for a plurality of sub-conferences, in accordance with the preferred embodiment of the present invention. Referring to FIG. 4A, a plurality of sub-conferences 302, 304, 306, 308, 310 are shown for an exemplary spatial layout. The sub-conferences can be created by a user sending a command signal (e.g., for voice recognition or DTMF tone) to the appropriate control unit (110 or 212) shown in FIG. 1A or 1B. If a user desires to leave a current sub-conference, the user can send a "leave" command to the appropriate control unit. That user (e.g., user x in FIG. 4A) is moved to the outer circle where all other sub-conferences are located in the spatial layout. As shown, the user x is not participating in any conference or sub-conference, and users A–E are participating in the same sub-conference 302.

In order to participate in another sub-conference, a user can send an "approach <argument>" command to the appropriate control unit. The "argument" is the identifier of one of the participants in that other sub-conference. The user will be placed in "front" of the participant identified in the "argument" in the spatial layout of that sub-conference, and then the user can begin to participate in that sub-conference. Notably, the user can also participate in another sub-conference without having to send a "leave" command to the control unit. Note that all of the sub-conferences are located at a relatively large spatial distance to any other sub-conference. Consequently, a participant in one sub-conference will hear all other participants in that sub-conference in the foreground, and the participants in other sub-conferences in the background. As illustrated by FIG. 4B, if a user (A) does not participate in any sub-conference, that user can be spatially located as shown. As such, that user (A) can listen to all of the sub-conferences (304–312) simultaneously, and can join and participate in one of the sub-conferences as desired.

In accordance with the present invention, by using such sub-conferences in a spatial layout as shown, there is less need to appoint a conference moderator (nevertheless, moderators will still likely be used for the sub-conferences). In any event, the participants can create sub-conferences themselves if so desired, and move between the sub-conferences freely. As such, using the present invention's spatial layout approach, the conference/sub-conference participants can be in effect their own moderators. Furthermore, by using such spatial layouts, users can attend multiple conferences as long as the audio stream from the conferences are distinguishable. In this regard, human beings are capable of monitoring numerous conversations simultaneously, and can focus on any one of the conversations while placing the other conversations in the background. This cognitive phenomenon, which the present invention preferably takes advantage of, is the so-called "Cocktail Party Effect". In other words, using a stereo headset along with the present invention's spatial layout approach, for example, a conference/sub-conference participant can distinguish audio streams from other participants due to their different spatial locations. The audio streams can appear to be coming from different directions (e.g., from different locations in a sub-conference), or to be originating at different distances (e.g., from other sub-conferences).

In order to create stereo sound in the preferred embodiment, the system can use pairs of audio channels. For example, in a fixed public network, an ISDN connection can provide two channels that can be used to provide stereo sound. Similarly, for example, a wideband cellular system can assign two channels for each such stereo connection to be used.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for distinguishing between participants in a conference call, comprising:

a plurality of terminals, each one of said plurality of terminals configured to send an audio signal and receive a spatial audio signal, said plurality of audio signals creating said conference call;

at least one sub-conference, perceived as background to said plurality of terminals in said conference call, said at least one sub-conference configured to send an audio signal;

a control unit coupled to said plurality of terminals, said control unit configured to output a spatial layout signal responsive to at least one command signal from said plurality of terminals and said at least one sub-conference; and a plurality of audio spatialization units, each one of said plurality of audio spatialization units coupled to said control unit, said plurality of terminals, and said at least one sub-conference, at least one of said plurality of audio spatialization units configured to output said spatial audio signal responsive to said spatial layout signal.

2. The system of claim 1, wherein said at least one command signal includes a voice command associated with said spatial layout signal.

3. The system of claim 1, wherein said at least one command signal includes a Dual Tone Multifrequency (DTMF) tone associated with said spatial layout signal.

4. The system of claim 2 or 3, wherein said at least one command signal includes a data signal transmitted over a signalling channel.

5. The system of claim 1, further comprising a command recognition unit coupled to at least one of said plurality of terminals and said control unit.

6. The system of claim 5, wherein said command recognition unit includes a voice recognition circuit.

7. The system of claim 5, wherein said command recognition unit includes a tone recognition circuit.

8. The system of claim 5, wherein said command recognition unit includes data signalling receiving circuitry.

9. The system of claim 1, wherein each one of said plurality of terminals is coupled to said control unit and said at least one of said plurality of audio spatialization units by a telecommunications network.

10. The system of claim 9, wherein said telecommunications network comprises a Public Switched Telephone Network (PSTN).

11. The system of claim 9, wherein said telecommunications network comprises a Public Land Mobile Network (PLMN).

12. The system of claim 9, wherein said telecommunications network comprises an Internet.

13. The system of claim 1, wherein said spatial layout signal determines a position for each of said participants in said conference call.

14. The system of claim 1, wherein said spatial layout signal determines a position for at least one participant within said at least one sub-conference.

15. The system of claim 1, wherein said spatial layout signal comprises a left-to-right order for said participants in said conference call.

16. The system of claim 1, wherein said plurality of terminals, said control unit, and said plurality of audio spatialization units comprise analog terminals and units.

17. The system of claim 1, wherein said plurality of terminals, said control unit, and said plurality of audio spatialization units comprise digital terminals and units.

18. A terminal for use in distinguishing between participants in a conference call, comprising:
 a control unit configured to output a spatial layout signal responsive to a first participant's preference; and
 an audio spatialization unit coupled to said control unit, said audio spatialization unit configured to receive a plurality of audio signals from terminals associated with other participants and from at least one sub-conference call, and output a spatial audio signal comprising said plurality of audio signals arranged in response to said spatial layout signal.

19. The terminal of claim 18, wherein said audio spatialization unit is coupled to said terminals associated with said other participants by a telecommunications network.

20. The terminal of claim 19, wherein said telecommunications network comprises a Public Switched Telephone Network (PSTN).

21. The terminal of claim 19, wherein said telecommunications network comprises a Public Land Mobile Network (PLMN).

22. The terminal of claim 19, wherein said telecommunications network comprises an Internet.

23. The terminal of claim 18, further comprising an analog terminal.

24. The terminal of claim 18, further comprising a digital terminal.

25. A method for distinguishing between participants in a conference call, comprising:
 each one of a plurality of terminals outputting an audio signal, said plurality of audio signals creating said conference call;
 at least one sub-conference outputting at least one sub-conference audio signal, said at least one sub-conference perceived as background to said conference call;
 generating a spatial layout signal responsive to at least one command signal; and
 generating a spatial audio signal responsive to said spatial layout signal, said spatial audio signal comprising said plurality of audio signals and said at least one sub-conference audio signal.

26. A system for providing spatialized audio for a plurality of conferences, said system comprising:
 a user terminal configured to receive a first spatial audio signal associated with participants of a first conference and a second spatial audio signal associated with at least one additional conference, said second spatial audio signal including at least one distance component that is different from any distance component of said first spatial audio signal;
 a control unit configured to output a spatial layout signal for said participants of said first conference and said at least one additional conference; and
 a spatialization unit coupled to said control unit and said user terminal, said spatialization unit for receiving audio signals associated with said participants of said first conference and audio signals associated with said at least one additional conference, said spatialization unit being configured to generate said first spatial audio signal and said second spatial audio signal.

27. The system according to claim 26, further comprising means for leaving said first conference, by said user terminal, and means for monitoring a plurality of conferences without participating in said plurality of conferences.

28. The system according to claim 27, wherein said plurality of conferences include said first conference and said at least one additional conference.

29. The system according to claim 27, further comprising means for bringing each of said plurality of conferences to the foreground in succession, thereby allowing said user terminal to choose a conference to participate in.

30. The system according to claim 26, wherein said first spatial audio signal associated with said participants of said first conference spatially separates each of said participants in a position determined by said user terminal, and said second spatial audio signal associated with said at least one additional conference spatially separates each of said at least one additional conference in a position determined by said user terminal.

31. The system according to claim 26, further comprising means for moving said user terminal from said first conference to a second conference selected from said at least one additional conference.

32. The system according to claim 26, further comprising means for participating, by said user terminal, in said at least one additional conference, said at least one additional conference being spatially separated from said participants of said first conference.

33. A terminal for providing spatialized audio for a plurality of conferences, said terminal comprising:
 a control unit configured to output a spatial layout signal, said spatial layout signal operable to configure a first spatial audio signal associated with participants of a first conference and a second spatial audio signal associated with at least one additional conference, said second spatial audio signal including at least one distance component that is different from any distance component of said first spatial audio signal; and
 an audio spatialization unit coupled to said control unit, said audio spatialization unit configured to receive a plurality of audio signals associated with said participants of said first conference and a plurality of audio signals associated with said at least one additional conference, said audio spatialization unit configured to output said first spatial audio signal and second spatial audio signal.

34. The terminal according to claim 33, further comprising means for leaving said first conference, by said terminal, and means for monitoring a plurality of conferences without participating in said plurality of conferences.

35. The system according to claim 34, wherein said plurality of conferences include said first conference and said at least one additional conference.

36. The system according to claim 34, further comprising means for bringing each of said plurality of conferences to the foreground in succession, thereby allowing said user terminal to choose a conference to participate in.

37. The terminal according to claim 33, wherein said first spatial audio signal associated with said participants of said first conference spatially separates each of said participants in a position determined by said terminal, and said second spatial audio signal associated with said at least one additional conference spatially separates each of said at least one additional conference in a position determined by said terminal.

38. The terminal according to claim 33, further comprising means for moving said terminal from said first conference to a second conference selected from said at least one additional conference.

39. The terminal according to claim 33, further comprising means for participating in a plurality of conferences that are spatially separated.

40. A method for providing spatialized audio for a plurality of conferences, said method comprising the steps of:
receiving audio signals associated with participants of a first conference and audio signals associated with at least one additional conference; and
generating a first spatial audio signal from said audio signals associated with said participants of said first conference and a second spatial audio signal from said audio signals associated with said at least one additional conference, said second spatial audio signal including at least one distance component that is different from any distance component of said first spatial audio signal.

41. The method according to claim 40, further comprising the steps of:
leaving said first conference, by a participant within said first conference; and
monitoring a plurality of conferences without participating in any of said plurality of conferences.

42. The method according to claim 41, wherein said plurality of conferences include said first conference and said at least one additional conference.

43. The method according to claim 41, further comprising the step of:
bringing each of said plurality of conferences to the foreground in succession, thereby allowing said user terminal to choose a conference to participate in.

44. The method according to claim 40, wherein said first spatial audio signal associated with said participants of said first conference spatially separates each of said participants in a position determined by said user terminal, and said second spatial audio signal associated with said at least one additional conference spatially separates each of said at least one additional conference in a position determined by said user terminal.

45. The method according to claim 40, further comprising the step of:
moving a user terminal participating in said first conference to a second conference selected from said at least one additional conference.

46. The method according to claim 40, further comprising the step of:
participation of a given participant in said at least one additional conference, said at least one additional conference being spatially separated from said participants of said first conference.

* * * * *